United States Patent [19]
Yamamoto et al.

[11] Patent Number: 5,891,296
[45] Date of Patent: Apr. 6, 1999

[54] APPARATUS AND METHOD FOR PEELING AND REMOVING A COATED FILM ON RESIN PRODUCT

[75] Inventors: Hiroshi Yamamoto, Oota; Kouji Takahashi, Nitta-Machi, both of Japan

[73] Assignee: Fuji Jukogyo Kabushiki Kaisha, Tokyo, Japan

[21] Appl. No.: 702,155

[22] Filed: Aug. 23, 1996

[30] Foreign Application Priority Data

Aug. 25, 1995 [JP] Japan ................................ 7-217389

[51] Int. Cl.⁶ ...................................................... B32B 35/00
[52] U.S. Cl. ............................ 156/344; 156/584; 29/239; 29/426.3; 100/162 R
[58] Field of Search .................................... 156/344, 584, 156/437; 100/162 R; 29/239, 426.3, 426.5; 284/37.3, 37.33

[56] References Cited

U.S. PATENT DOCUMENTS

| | | | |
|---|---|---|---|
| 3,369,483 | 2/1968 | Muller | 100/162 R |
| 4,131,063 | 12/1978 | Joutsjoki | 100/162 R |
| 4,497,246 | 2/1985 | Pav et al. | 100/162 R X |
| 4,599,131 | 7/1986 | Matuszak | 156/344 X |
| 5,100,063 | 3/1992 | Bauer | 241/14 |
| 5,194,109 | 3/1993 | Yamada | 156/344 X |
| 5,304,276 | 4/1994 | MacLeod et al. | 156/344 |

FOREIGN PATENT DOCUMENTS

| | | | |
|---|---|---|---|
| 59-142115 | 8/1984 | Japan | 156/344 |
| 63-202409 | 8/1988 | Japan | 156/344 |

*Primary Examiner*—Mark A. Osele
*Attorney, Agent, or Firm*—Beveridge, DeGrandi, Weilacher & Young, LLP

[57] ABSTRACT

A film peeling and removing apparatus is provided for peeling or removing a film from a resin material of a coated resin member of a coated resin product. The film peeling apparatus includes a resin-material-side roll, a film-side roll and a third roll. The film-side roll rotates at a higher peripheral speed than that of the resin-material-side roll. The film-side roll is associated with the resin-material-side roll for rolling the coated resin member therebetween while applying a shearing stress film from the film resin material. Then, the resin material is fed between the resin-material-side roll and the third roll while being curved along the roll surface of the resin material roll. The third roll is associated with the resin-material-side roll for rolling ±ed ted resin material therebetween while applying a shearing stress between a residual film and the resin material so as to peel the residual film from the resin material.

18 Claims, 6 Drawing Sheets

APPARATUS AND METHOD FOR PEELING AND REMOVING A COATED FILM ON RESIN PRODUCT

BACKGROUND OF THE INVENTION

1. Field of the Invention

The present invention relates to an apparatus for peeling and removing films on a resin product and the method thereof. More specifically, the invention relates to an apparatus for peeling and removing a coated film on resin product, e.g. a bumper or a side lacing, which is used as a decoration of an automotive vehicle or a functional part serving as a buffer, i.e., a shock absorber, or a CD-ROM, and the method thereof.

2. Description of the Prior Art

In recent years, increasing attention is being paid to the environmental problems and the reuse of natural resources, so that the recycling resin products has been proposed. For example, in the field of the automobile industry, the recycling of defective products produced in the manufacturing process of the resin products such as a bumper, a side lacing, or the recycled resin products removed and recovered from scrapped cars have been widely noticed.

These kinds of resin products are often coated in order to enhance the external appearance and the quality thereof. For example, in the case of a typical bumper, a film is coated on a resin material of a thermoplastic resin such as a polypropylene resin, via a primer layer of a thermoplastic resin such as a chlorinated polyolefine resin. This film is a thermosetting resin such as an amino polyester resin, an amino acrylic resin, a polyester urethane resin or an acrylic urethane resin. Although these resins are liquid before curing, a bridge (i.e., crosslinked) structure i.e. an intermediate process between the base surface treatment and the top coat is formed therein by the baking finish process. Since this structure is firm strong and hard, the coated resin bumper has superior chemical resistance, heat resistance, abrasion resistance, weatherproof and surface glossiness.

However, when this coated bumper is directly crushed to pellets for reuse, the polypropylene resin material served as the base material of the resin product is contaminated with film pieces. When such a polypropylene resin material contaminated with the film pieces is molded, the fluidity of the molten resin is inhibited by the presence of the film pieces, so that molding defects, such as "yellowing", "weld mark" and "bubble", may occurred in the resin product, and the film pieces rising to the surface of the resin product may spoil the external appearance of the resin product.

In addition, although the film piece is a thermosetting resin, the polypropylene resin serving as a base resin is a thermoplastic resin. Therefore, since there is no appreciable interaction reaction, mixing-up between the film piece and the base resin, kneading of the regenerated recycled resin is inhibited by the film pieces which have not been minutely dispersed. So that the kneading notably deteriorate the mechanical property of the recycled resin product and to large restricts the application range of the recycle resin product.

Figure 1:
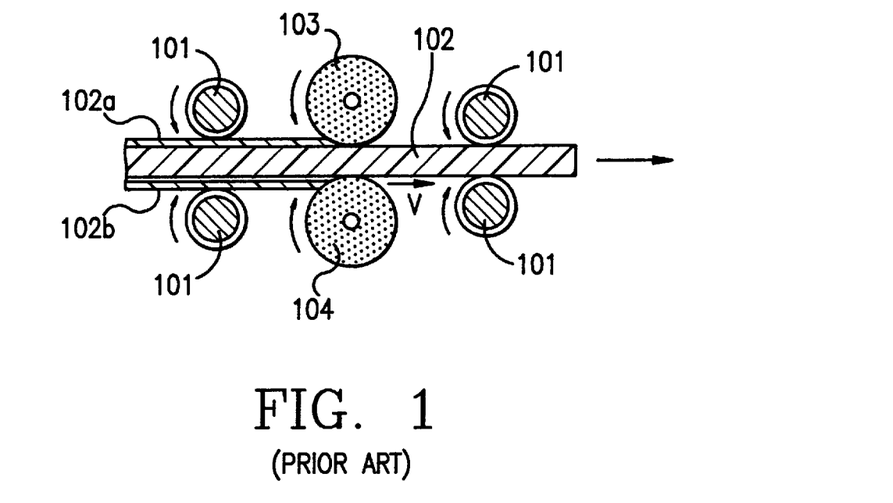
FIG. 1 is a schematic view of a conventional film peeling apparatus.

Therefore, it is required to remove the film when the coated resin product is recycled. Such a system for removing or peeling a film from a resin product is disclosed in Japanese Patent Laid-Open No. 5-337941. This illustrates a peeling apparatus for the surface of a synthetic resin as shown in FIG. 1.

In this peeling apparatus, a resin product, e.g. a side lacing 102, such as, for instance, a side protection molding, is carried, by a pair of carrier rollers 101, to the place between rotating bodies 103 and 104 of an expandable synthetic resin. The carrier speed V of the side lacing 102 is set to be lower than the peripheral rotating speed of the rotating bodies 103 and 104, so as to cut and remove a film 102*a* and a double-faced tape 102*b* from the side lacing 102 by applying a strong frictional force to the film 102*a* and the double-faced tape 102*b* on the side lacing 102. Then, the side lacing 102 is carried to the outside by means of a pair of carrier rollers 101.

In this apparatus, since the resin product is brought into contact with the rotating bodies 103 and 104 of an expandable synthetic resin, the brittle fracture of the rotating bodies 103 and 104 may occurs and dusts may be produced. So that the environmental condition of the work place become deteriorated. In addition, this apparatus is not suitable for bent or curved resin products.

SUMMARY OF THE INVENTION

It is therefore an object of the present invention to provide an apparatus for peeling and removing coated films on resin products, which has superior film removing efficiency, environmental safety and capacity and which can obtain a recycled resin product of a high quality, and the method thereof.

In order to accomplish the aforementioned and other objects, according to one aspect of the present invention, a method for removing or peeling the film from a resin material of a coated resin member of a coated resin product by applying a shearing stress between the film and the resin material by rolling the coated resin member between rolls which have different rotating directions and different peripheral speeds, comprises the steps of: rolling the coated resin member between a first roll placed on the side of the resin material and a second roll placed on the side of the film, the second roll rotating at a higher peripheral speed than that of the first roll, so as to apply a shearing stress between the film and the resin material to peel the film from the resin material while causing the resin material to be curved along a roll surface of the first roll; feeding the resin material between the first roll and a third roll facing the first roll; and rolling the resin material between the first roll and the third roll so as to apply a shearing stress between a residual film and the resin material to peel the residual film from the resin material.

According to another aspect of the present invention, an apparatus for peeling and removing a coated films on resin member of a coated resin product by applying a shearing stress between the film and the resin material by rolling the coated resin member between rolls which have different rotating directions and different peripheral speeds, comprises: a first roll placed on the side of the resin material; a second roll placed on the side of the film, the second roll rotating at a higher peripheral speed than that of the first roll, the second roll being associated with the first roll for rolling the coated resin member therebetween so as to apply a shearing stress between the film and the resin material to peel the film from the resin material while causing the resin material to be curved along a roll surface of said first roll; and a third roll facing the first roll and being associated with the first roll for rolling therebetween the resin material which has been rolled between the first and second rolls, so as to apply a shearing stress between a residual film and the resin material to peel the residual film from the resin material.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to this specific embodiment, but are for explanation and understanding only.

In the drawings.

DESCRIPTION OF THE PREFERRED EMBODIMENTS

Referring now to the drawings, the preferred embodiments of an apparatus for peeling and removing coated films on resin products and the method thereof, according to the present invention, will be described below. As a shown embodiment, the collection and recycle of a coated resin bumper, which is a relatively large article among automotive parts, will be described.

Figure 2:
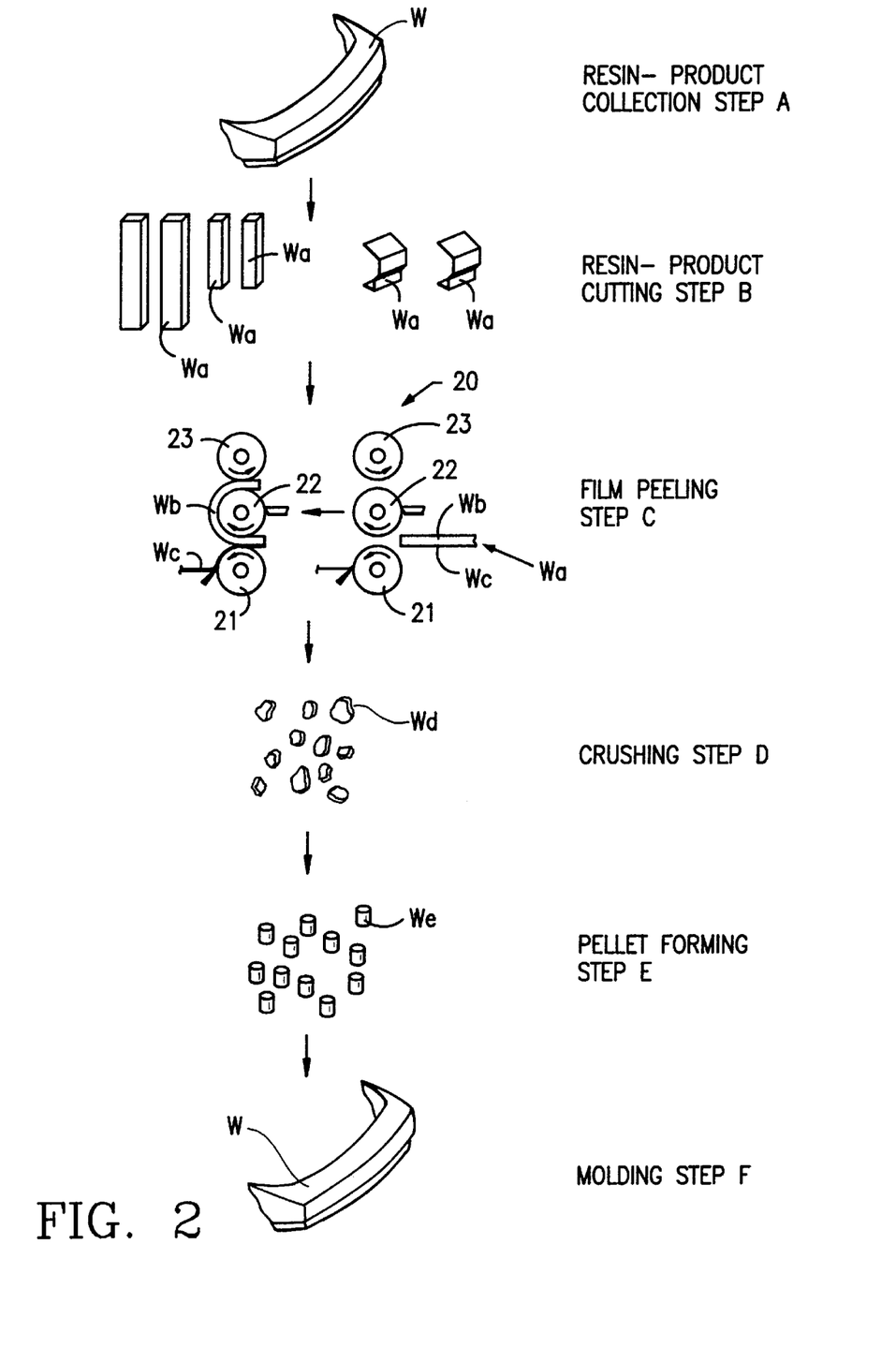
FIG. 2 is a schematic view illustrating a method for recycling a coated resin product according to the present invention.

FIG. 2 is a view schematically illustrating a method for recycling a coated resin product, to which the preferred embodiments of a film peeling apparatus and the method thereof, according to the present invention, are applied.

Referring to FIG. 2, this recycling method will be described. In a resin-product collection step A, a bumper W which is produced in the manufacturing and assembling of a resin bumper or which is removed from a scrapped car, is collected, and the metal portion thereof is removed from the bumper W. If necessary, in the next resin-product cutting step B, the bumper W is cut to be divided into resin members Wa of a predetermined width.

Then, in a film peeling step C, the film Wc of the resin member Wa is peeled from the resin material Wb by means of a film peeling apparatus 20 which will be described later.

The resin material Wb obtained by removing the film Wc in the film peeling step C, is crushed by means of a shredder or the like to be crushed materials Wd in a crushing step D.

Then, in a pellet forming step E, the crushed materials Wd are supplied to, for example, an extruder. In the extruder, the crushed materials Wd fed to a hopper are moved forward in a heating cylinder by the rotation of a screw, and heated therein by means of a heater or the like. While the crushed materials Wd are moved forward in the heating cylinder, they are melted and extruded from a die to produce pellets We having a predetermined shape. At this time, the residual film pieces are removed by means of a screen mesh provided at the end portion of the heating cylinder. Furthermore, it is possible to enhance the capacity and the productivity if the screen mesh can be automatically replaced.

Then, in a molding step F, a resin product such as a bumper W is molded again, after pellets of a virgin polypropylene resin are added to the pellets We obtained in the pellet forming step E, if necessary.

While the crushed materials Wd have been processed so as to form pellets in the pellet forming step E, it is possible to omit the pellet forming step E if the crushed materials Wd are finely crushed materials.

Figure 3:
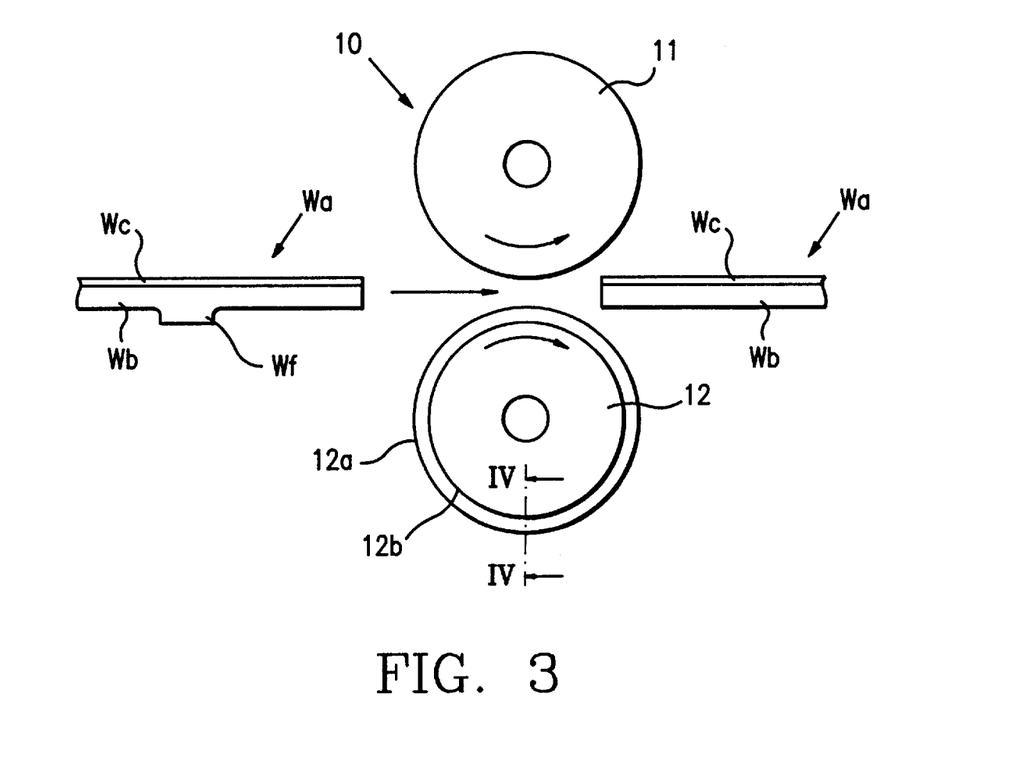
FIG. 3 is a schematic view of a protruding-portion shearing apparatus used for recycling the coated resin product.

In the film peeling step C, protruding portions Wf, such as ribs, which protrude from the resin member Wa, are cut by means of a protruding-portion shearing apparatus 10 (as is shown in FIG. 3) so as to smooth the surface thereof, and the film Wc is peeled and removed from the resin material Wb by means of a film peeling apparatus 20. The protruding-portion shearing apparatus 10 and the film peeling apparatus 20 will be described below.

FIG. 3 shows a cross section of the main portion of the protruding-portion shearing apparatus 10. As shown in FIG. 3, the protruding-portion shearing apparatus 10 has a supporting roll 11 and a shearing roll 12 which face each other.

Figure 4A:
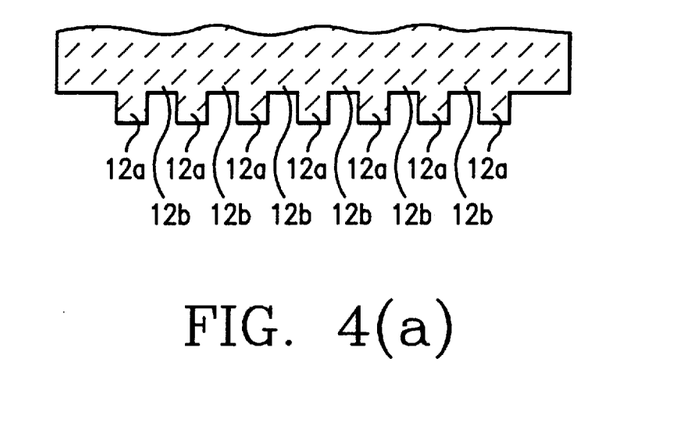
FIG. 4(a) is a sectional view of a shearing roll of the protruding-portion shearing apparatus of FIG. 3, taken along line IV—IV of FIG. 3.
Figure 4B:
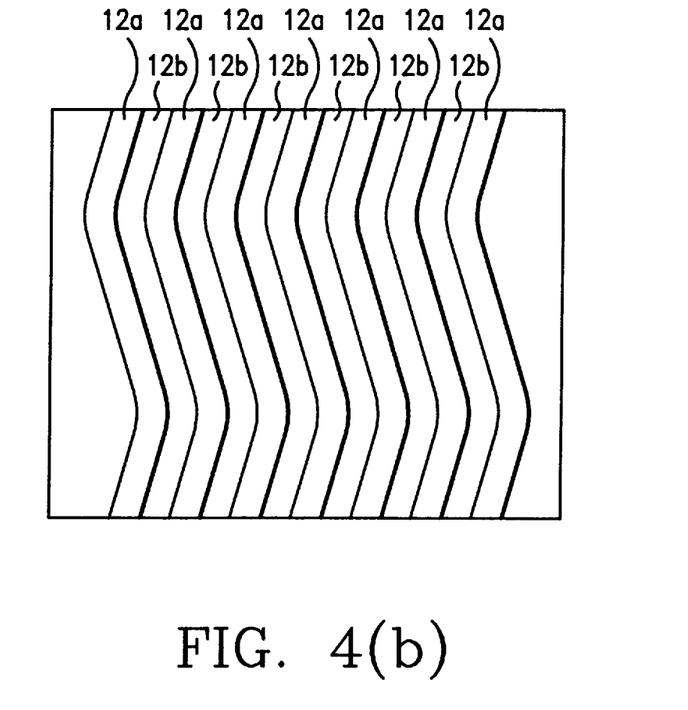
FIG. 4(b) is a development of a roll surface of the shearing roll of FIG. 4(a)

FIG. 4(a) is a sectional view taken along line IV—IV of FIG. 3, and FIG. 4(b) is a development of the roll surface of the shearing roll 12. As shown in FIGS. 4(a) and 4(b), the shearing roll 12 is formed with shearing teeth 12a of smoothly meandering annular projections which extend in the circumferential directions of the cylindrical shearing roll 12 while smoothly meandering. The shearing teeth 12a are spaced at regular intervals in the directions of the rotation axis of the shearing roll 12, so as to form smoothly meandering annular grooves 12b between the adjacent shearing teeth 12a.

The supporting roll 11 and the shearing roll 12 are rotated by means of drive units which rotate in an opposite direction to each other so that the supporting roll 11 and the shearing roll 12 are associated with each other for nipping and discharging the resin member Wa fed therebetween, and at different peripheral rotating speeds so that the peripheral rotating speed of the shearing roll 12 is higher than that of the supporting roll 11.

Therefore, as shown in FIG. 3, when the resin member Wa having the protruding portion Wf, such as a rib, is fed between the supporting roll 11 and the shearing roll 12 rotating at different peripheral rotating speeds, the supporting roll 11 and the shearing roll 12 are associated with for discharging the resin member Wa. In addition, the protruding portion Wf is introduced into the grooves 12b of the shearing roll 12 to be sheared and removed by means of the annular shearing teeth 12a, which smoothly meander along the surface of the roll, so as to make the resin member Wa flat.

Since the sheared surface is formed by shearing and removing the protruding portion Wf by means of the smoothly meandering annular shearing teeth 12a, the protruding portion Wf is smoothly cut by means of the shearing teeth 12a so as not to be strongly struck on the shearing teeth 12a.

The flat resin member Wa obtained by cutting the protruding portion Wf is supplied to the film peeling apparatus 20 after the shapes of the end portions thereof are modified if necessary.

Figure 5:
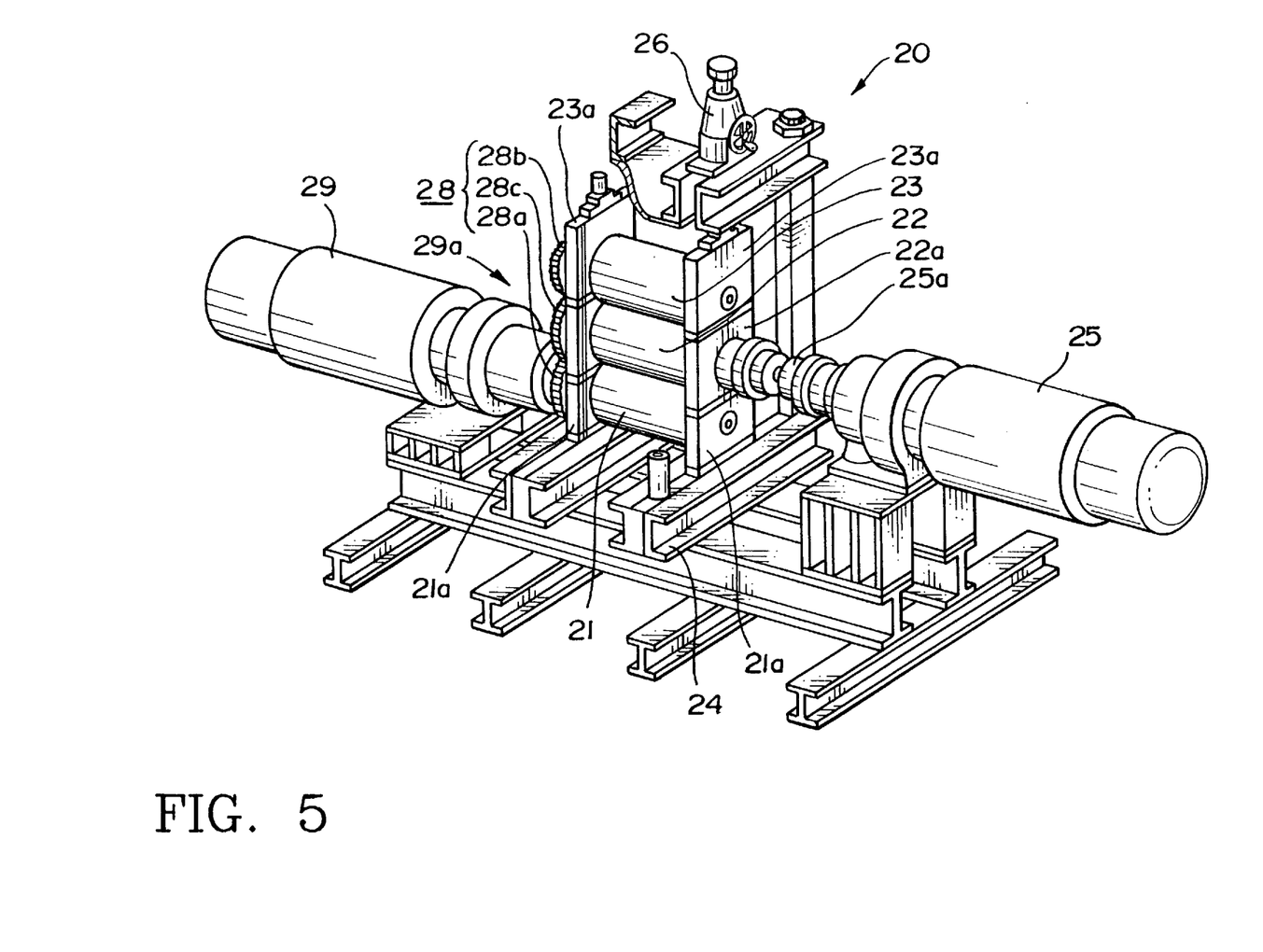
FIG. 5 is a perspective view of the preferred embodiment of a film peeling apparatus according to the present invention.

FIG. 5 is a perspective view of the film peeling apparatus 20. The film peeling apparatus 20 has a film-side roll 21, a resin-material-side roll 22 facing the film-side roll 21, and a third roll 23 facing the resin-material-side roll 22.

The film-side roll 21, the resin-material-side roll 22 and the third roll 23 are made of a metal. The roll surfaces of these rolls are processed by a specular glassing treatment, for example, to have a mirror finished surface, or with chrome plating, for example, to have a chrome plated surface. The film-side roll 21 is rotatably supported on a pair of film-side roll supporting members 21a which are provided on supporting frames 24 placed apart from each other. The film-side roll 21 is rotated by a drive unit 29, such as a motor with a reduction gear, which is connected to the film-side roll 21 via an universal coupling 29a.

The resin-material-side roll 22 is rotatably supported on a pair of resin-material-side roll supporting members 22a which are supported on the supporting frames 24 so as to move upwards and downwards. The resin-material-side roll 22 is rotated by a drive unit 25, such as a motor with a reduction gear, which is connected to the resin-material-side roll 22 via an universal coupling 25a. When the resin-material-side roll supporting members 22a are moved upwards and downwards by lifting means 26, the resin-material-side roll 22 also moves upwards and downwards so as to adjust the distance between the film-side roll 21 and the resin-material-side roll 22. By this adjustment, it is possible to adjustably set the thickness of the film to be removed from the resin member Wa, and the pressing force applied to the resin material Wa.

The film-side roll 21 and the resin-material-side roll 22 are rotated at different peripheral rotating speeds so that the peripheral speed of the film-side roll 21 pressingly contacting the surface of the film Wc is set to be higher than the peripheral speed of the resin-material-side roll 22 pressingly contacting the surface of the resin material Wb. In addition, the film-side roll 21 and the resin-material-side roll 22 are rotated in opposite directions so that the pressing force is applied to the resin member Wa fed between the rolls 21 and 22.

The third roll 23 is rotatably supported on a pair of third roll supporting members 23a. The third roll supporting members 23a are supported on the supporting frames 24 so as to move upwards and downwards to adjust the distance between the resin-material-side roll 22 and the third roll 23. The third roll 23 is rotated at the same direction as that of the film-side roll 21, via reduction gear means 28, by means of the drive unit 29 for rotating the film-side roll 21.

Figure 6:
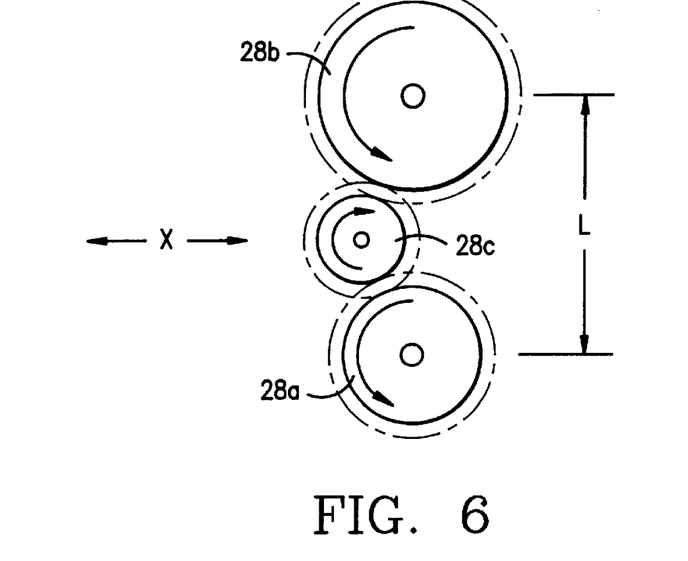
FIG. 6 is a view illustrating the operation of reduction gear train of the film peeling apparatus of FIG. 5.

The reduction gear means 28 comprises a driving gear 28a rotated by the drive unit 29 for rotating the film-side roll 21, a driven gear 28b provided on the rotation axis of the third roll 23, and an idle gear 28c provided between the driving gear 28a and the driven gear 28b. As shown in FIG. 6, when the distance L between the driving gear 28a and the driven gear 28b varies in accordance with the upward and downward movements of the third roll supporting members 23a, the idle gear 28c moves in direction X perpendicular to the line drawn between the axes of the driving gear 28a and the driven gear 28b, so as to assure the engagements of the driving gear 28a and the driven gear 28c with the idle gear 28c.

Figure 7:
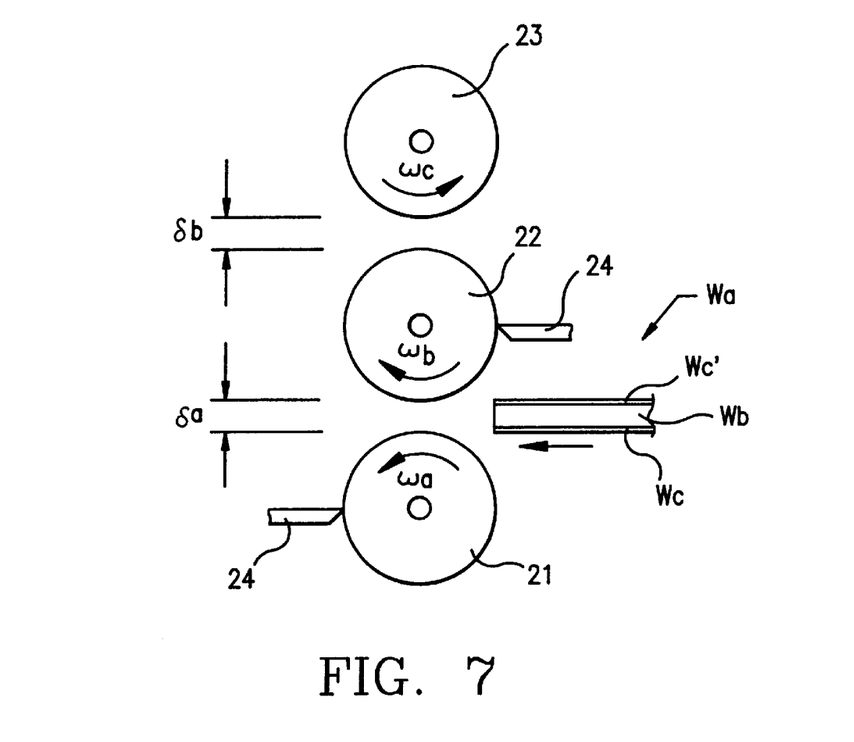
FIGS. 7 through 10 are views each illustrating the operation of the film peeling apparatus of FIG. 5.

As shown in FIG. 7, the distance $\delta a$ between the film-side roll 21 and the resin-material-side roll 22 is set to be not less than the distance $\delta b$ between the film-side roll 21 and the third roll 23, i.e. $\delta a \geq \delta b$. The respective rolls 21, 22 and 23 are rotated so that the rotating directions of the film-side roll 21 and the third roll 23 are different from the rotating direction of the resin-material-side roll 22. The peripheral speed decreases in order of the peripheral speed $\omega a$ of the film-side roll 21, the peripheral speed $\omega b$ of the resin-material-side roll 22 and the peripheral speed $\omega c$ of the third roll, i.e. $\omega a > \omega b > \omega c$.

Therefore, the resin member Wa fed between the film-side roll 21 and the resin-material-side roll 22 is rolled by the pressing force against the film-side roll 21 and the resin-material-side roll 22. In addition, the shearing stress is applied between the film Wc and the resin material Wb on the basis of the difference between the peripheral rotating speeds of the rolls 21 and 22, so that the film Wc is peeled from the resin material Wb.

In the peeling of the film Wc, the peripheral speed of the film-side roll 21 pressingly contacting the film Wc is set to be higher than the peripheral speed of the resin-material-side roll 22 pressingly contacting the resin material Wb. Therefore, the resin member Wa is large drawn on the side of the film Wc in comparison with the side of the resin material Wb, so that the resin material Wb is discharged while being curved along the roll surface of the resin-material-side roll 22.

Figure 8:
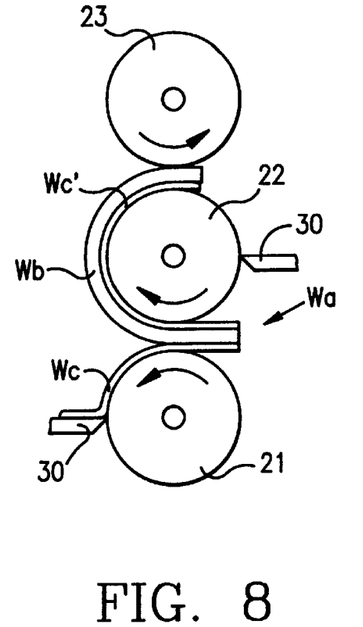

As shown in FIG. 8, the resin material Wb discharged while being curved along the roll surface of the resin-material-side roll 22 reaches the portion between the resin-material-side roll 22 and the third roll 23, and then, it is nipped between the resin-material-side roll 22 and the third roll 23.

The resin material Wb nipped between the resin-material-side roll 22 and the third roll 23 is rolled again by the pressing force against the resin-material-side roll 22 and the third roll 23. In accordance with the difference between the peripheral speeds of the rolls 22 and 23, the shearing stress is applied between the resin material Wb and a film or mist Wc' formed on the reverse surface of the resin material Wb obtained by peeling the film Wc by the film-side roll 21 and the resin-material-side roll 22. Furthermore, the reference number 30 denotes a scraper for approaching the film-side roll 21 and the resin-material-side roll 22 to scrape the film or the like adhered to the roll surfaces of the rolls 21 and 22. The film or the like scraped by the scraper 24 is discharged from the film peeling apparatus 20 by means of a belt conveyer or the like to be collected.

The resin member Wa fed between the film-side roll 21 and the resin-material-side roll 22 is successively rolled between the film-side roll 21 and the resin-material-side roll 22 and between the resin-material-side roll 22 and the third roll 23, and the shearing stress is applied therebetween. Therefore, it is possible to peel and remove the film Wc formed on both surfaces of the resin material Wb or the mist adhered thereto, from the resin material Wb in a single step, so as to efficiently peal the film Wc from the resin member Wa.

Figure 9:
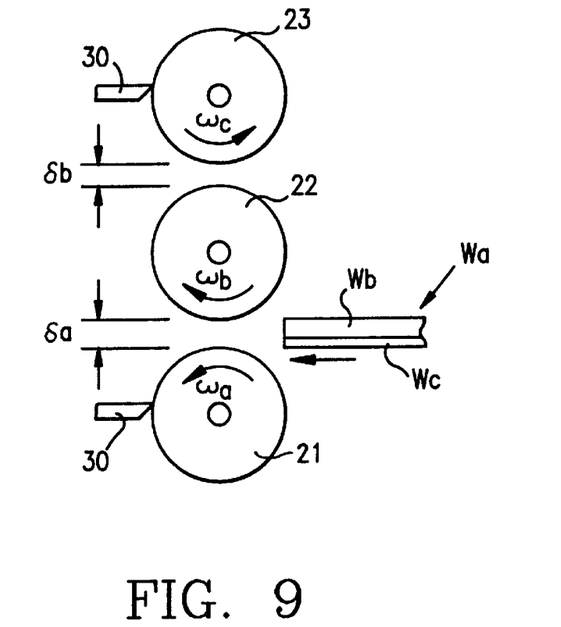

Alternatively, as shown in FIG. 9, when the peripheral speed $\omega c$ of the third roll 23 is set to be higher, i.e., not smaller, than the peripheral speed $\omega b$ of the resin-material-side roll 22 so that the residual film on the surface of the resin material Wb obtained by peeling the film by means of the film-side roll 21 and the resin-material-side roll 22 is peeled again, it is possible to completely peel and remove the residual film from the surface of the resin material.

Specifically, the gap $\delta b$ between the film-side roll 21 and the third roll 23 relative to the gap $\delta a$ between the film-side roll 21 and the resin-material-side film 22 is set to be $\delta a \geq \delta b$. In addition, the respective rolls 21, 22 and 23 are rotated so that the peripheral speed $\omega a$ of the film-side roll 21 is higher than the peripheral speed $\omega b$ of the resin-material-side roll 22 and the peripheral speed $\omega c$ of the third roll 23 is higher than the peripheral speed $\omega b$ of the resin-material-side roll 22, i.e. $\omega a \geq \omega b < \omega c$.

Therefore, the resin material Wa fed between the film-side roll 21 and the resin-material-side roll 22 is rolled by the pressing force against the film-side roll 21 and the resin-material-side roll 22, and the film Wc is peeled from the resin material Wb by the shearing stress applied between the film Wc and the resin material Wb on the basis of the difference between the peripheral rotating speeds of the rolls 21 and 22.

Since the peripheral speed of the film-side roll 21 is higher than the peripheral speed of the resin-material-side roll 22, when the film Wc is peeled from the resin material Wa, the resin material Wa on the side of the film Wc is large extended, so that the resin material Wb is discharged while being curved along the roll surface of the resin-material-side roll 22.

Figure 10:
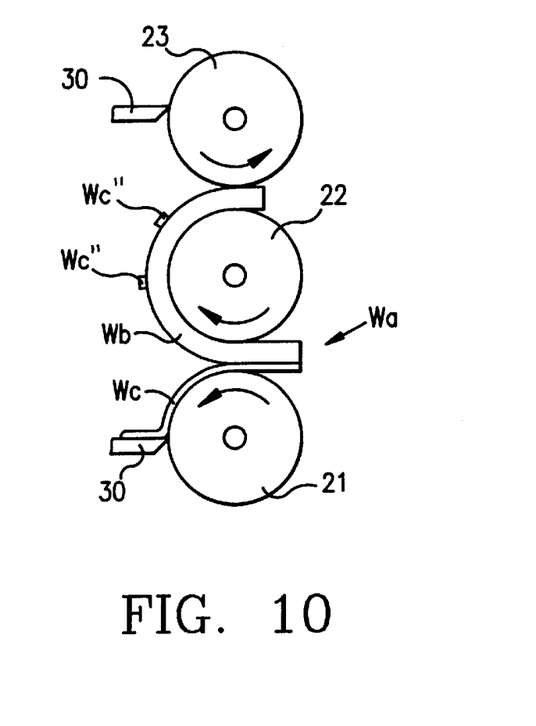

Then, the resin material wb discharged along the roll surface of the resin-material-side roll 22 reaches the place between the resin-material-side roll 22 and the third roll 23 to be nipped between the resin-material-side roll 22 and the third roll 23 as shown in FIG. 10.

The resin material Wb nipped between the resin-material-side roll 22 and the third roll 23 is rolled again by the pressing force against the resin-material-side roll 22 and the third roll 23. In addition, on the basis of the speed difference between the peripheral speeds of the rolls 22 and 23, the film-side roll 21 is associated with the resin-material-side roll 22 for applying the shearing stress between the resin material Wb and the residual film Wc" on the surface of the resin material Wb obtained by peeling the film Wc, so as to peel the residual film Wc" from the resin material Wb.

Therefore, when the resin member Wa is fed between the film-side roll 21 and the resin-material-side roll 22, the film Wc is peeled and removed from the resin material Wb between the film-side roll 21 and the resin-material-side roll 22. In addition, the residual film Wc" is successively peeled and removed from the resin material Wb between the resin-material-side roll 22 and the third roll 23 so as to improve the efficiency for peeling and removing the film Wc.

While the third roll 23 has been rotated, via the reduction gear 28, by means of the drive unit 29 for rotating the film-side roll 21, in the shown embodiment, it can be rotated, via transmitting means, by means of the drive unit 25 for rotating the resin-material-side roll 22. Alternatively, it is possible to provide an additional drive unit for rotating the third roll 23.

In addition, when a film is removed from a flat resin member which does not have any protruding portions, such as a CD-ROM, it is possible to omit the step for shearing the protruding portions by the protruding-portion shearing apparatus, so as to simplify the operation. While the method for peeling films on an automotive bumper and a CD-ROM have been described, the present invention can be widely applied to the peeling of films from other coated resin products.

According to the present invention, a resin member comprising a resin material and a film coated thereon is rolled between a film-side roll and a resin-material-side roll which rotate at different peripheral speeds. In addition, a shearing stress is applied between the resin material and the film so as to peel the film from the resin material. Then, the resin material is discharged while being curved along the roll surface of the resin-material-side roll, so as to be fed between the resin-material-side roll and the third roll. Then, the resin material is rolled again between the resin-material-side roll and the third roll so as to peel the film from the resin material by applying a shearing stress between the film and resin material. Therefore, a film peeling method of the present invention has a superior environmental safety to conventional film removing methods. In addition, the film is successively peeled between the film-side roll and the resin-material-side roll and between the resin-material-side roll and the third roll. Therefore, the present invention has superior advantageous effects in that it is possible to efficiently obtain a resin material having an extremely high film removing efficiency, and that it is possible to stably produce high-quality recycle resin products. In addition, the present invention can contribute to the recycle of coated resin products in various fields While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A method for removing a coated film coated on a resin product from said resin product, comprising:

inserting said resin product having said coated film coated thereon between a first roll and a second roll;

removing said coated film from said resin product by applying a first shearing stress therebetween by rotating said first roll at a peripheral speed different from a peripheral speed of said second roll;

conveying said coated film removed from said resin product along said first roll;

conveying said resin product having said coated film removed therefrom along said second roll;

inserting said resin product between said second roll and a third roll; and removing residual film which was not fully removed from said resin product upon application of said first shearing stress by applying a second shearing stress between said resin product and said residual film so as to more completely remove and separate said coated film from said resin product.

2. The method defined in claim 1, further comprising the step of:

conveying said residual film removed from said resin product along said third roll.

3. The method defined in claim 2, further comprising the step of:

removing said coated film from said first roll with a first roll scraper member and removing said residual film from said third roll with a third roll scraper member.

4. A method for removing a first coated film coated on one side of a resin product and a second coated film coated on the other side of said resin product, comprising:

inserting said resin product having said coated films coated thereon between a first roll and a second roll;

removing said first coated film from said resin product by applying a first shearing stress therebetween by rotating said first roll at a peripheral speed different from a peripheral speed of said second roll;

conveying said first coated film removed from said resin product along said first roll;

conveying said resin product having said second coated film coated thereon along said second roll;

inserting said resin product having said second coated film coated thereon between said second roll and a third roll; and removing said second coated film from said resin product by applying a second shearing stress therebetween by rotating said second roll at a peripheral speed different from said third roll so as to remove and separate said first and said second coated films from said resin product.

5. The method defined in claim 4, further comprising the step of:
conveying said second coated film removed from said resin product along said second roll.

6. The method defined in claim 5, further comprising the step of:
removing said first coated film from said first roll with a first roll scraper member and removing said second coated film from said second roll with a second roll scraper member.

7. An apparatus for removing at least one coated film from a resin product on which said coated film is coated, comprising:
a first roll;
a second roll arranged opposite to said first roll to form a first clearance between said first roll and said second roll;
a third roll arranged opposite to said second roll to form a second clearance between said second roll and said third roll;
first roll rotating means for rotating said first roll at a first peripheral speed;
second roll rotating means for rotating said second roll at a second peripheral speed;
said second peripheral speed being lower than said first peripheral speed for creating a shearing stress on said resin product inserted in said first clearance in order to separate said coated film from said resin product and for conveying said coated film along said first roll and said resin product along said second roll in order to convey said resin product into said second clearance; and
third roll rotating means for rotating said third roll at a third peripheral speed.

8. The apparatus defined in claim 7, wherein:
said apparatus removes one coated film; and
said third peripheral speed being larger than said second peripheral speed for creating a shearing stress on said resin product inserted in said second clearance, and
wherein said third roll rotating means separates a residual film of said coated film that was not fully removed by said first and second rolls from said resin product.

9. The apparatus defined in claim 8, wherein:
said first, second and third rolls are relatively arranged such that said first clearance is larger than said second clearance.

10. The apparatus defined in claim 8, wherein:
said first, second and third rolls are relatively arranged such that at least one of said first and second clearances is adjustable so as to control a pressing force applied to said resin product.

11. The apparatus defined by claim 8 further comprising:
a first roll scraper member positioned to scrape away from said first roll a refuse of said coated film removed from said resin product and conveyed along said first roll, and
a third roll scraper member positioned to remove said residual film from said third roll after said residual film is removed from said resin product and conveyed along said third roll.

12. The apparatus defined in claim 7, wherein:
said apparatus removes first and second coated films coated respectively on opposite sides of a resin product from said resin product;
said third peripheral speed being lower than said second peripheral speed for creating a shearing stress on said resin product inserted in said second clearance; and
wherein said third roll rotating means separates said second coated film from said resin product.

13. The apparatus defined in claim 12, wherein:
said first, second and third rolls are relatively arranged such that said first clearance is larger than said second clearance.

14. The apparatus defined by claim 12, wherein
said first, second and third rolls are relatively arranged such that at least one of said first and second clearances is adjustable so as to control a pressing force applied to said resin product.

15. The apparatus defined by claim 12, further comprising:
a first roll scraper member positioned to scrape away from said first roll a refuse of said first coated film removed from said resin product and conveyed along said first roll; and
a second roll scraper member positioned to scrape away from said second roll a refuse of said second coated film removed from said resin product and conveyed along said second roll.

16. An apparatus for removing a coated film from a resin product, comprising:
a first roll;
a second roll arranged opposite to said first roll to form a first clearance between said first roll and said second roll;
a third roll arranged opposite to said second roll to form a second clearance between said second roll and said third roll, said first clearance being larger than said second clearance;
first roll rotating means for rotating said first roll at a first peripheral speed;
second roll rotating means for rotating said second roll at a second peripheral speed;
said second peripheral speed being different from said first peripheral speed for creating a shearing stress on said resin product inserted in said first clearance in order to separate said coated film from said resin product; and
third roll rotating means for rotating said third roll at a third peripheral speed;
said third peripheral speed being different from said second peripheral speed for creating a shearing stress on said resin product inserted in said second clearance and for separating said coated film from said resin product.

17. An apparatus for removing a coated film from a resin product on which said coated film is coated, comprising:
a first roll;
a second roll arranged opposite to said first roll to form a first clearance between said first roll and said second roll;
a third roll arranged opposite to said second roll to form a second clearance between said second roll and said third roll;
first rotating means for rotating said first roll at a first peripheral speed;

second rotating means for rotating said second roll at a second peripheral speed;

said second peripheral speed being different from said first peripheral speed for creating a shearing stress on said resin product inserted in said first clearance in order to separate said coated film from said resin product;

third rotating means for rotating said third roll at a third peripheral speed;

said third peripheral speed being different from said second peripheral speed for creating a shearing stress on said resin product inserted in said second clearance and for separating said coated film from said resin product; and scraper means positioned to scrape away from at least one of said rolls a refuse of said coated film removed from said resin product and conveyed along said one of said rolls.

18. An apparatus for removing a coated film from a resin product on which said coated film is coated, comprising:

a first roll;

a second roll arranged in parallel with said first roll to form a first clearance between said first roll and said second roll;

a third roll arranged in parallel with said second roll to form a second clearance between said second roll and said third roll, said first, second and third rolls being aligned straight;

first rotating means for rotating said first roll at a first peripheral speed;

second rotating means for rotating said second roll at a second peripheral speed;

said second peripheral speed being lower than said first peripheral speed for creating a shearing stress on said resin product inserted in said first clearance and for separating said coated film from said resin product and for conveying said resin product along said second roll; and third rotating means for rotating said third roll at a third peripheral speed, said third peripheral speed being different from said second peripheral speed for creating a shearing stress on said resin product inserted in said second clearance and for separating said coated film from said resin product.

* * * * *